United States Patent
Szeremeta et al.

(10) Patent No.: US 7,940,491 B2
(45) Date of Patent: May 10, 2011

(54) INFORMATION STORAGE DEVICE HAVING A DISK DRIVE AND A BRIDGE CONTROLLER PCB WITHIN A MONOLITHIC CONDUCTIVE NEST

(75) Inventors: Wally Szeremeta, Mission Viejo, CA (US); Brian S. Nihei, Fountain Valley, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 417 days.

(21) Appl. No.: 12/211,037

(22) Filed: Sep. 15, 2008

(65) Prior Publication Data
US 2010/0067344 A1 Mar. 18, 2010

(51) Int. Cl.
*G11B 5/012* (2006.01)

(52) U.S. Cl. ............... 360/97.01; 360/97.02; 360/133; 361/679.33

(58) Field of Classification Search ........... 360/97.01, 360/97.02, 133; 361/679.33
See application file for complete search history.

(56) References Cited

U.S. PATENT DOCUMENTS

| | | | |
|---|---|---|---|
| 5,175,395 A | 12/1992 | Moore | |
| 5,243,495 A | 9/1993 | Read et al. | |
| 5,726,864 A | 3/1998 | Copeland et al. | |
| 5,748,449 A | 5/1998 | Tahmassebpur | |
| 6,005,768 A | 12/1999 | Jo | |
| 6,018,125 A | 1/2000 | Collins et al. | |
| 6,102,708 A | 8/2000 | Kimura | |
| 6,194,653 B1 | 2/2001 | McMiller et al. | |
| 6,266,712 B1 * | 7/2001 | Henrichs | 710/8 |
| 6,292,373 B1 | 9/2001 | Li et al. | |
| 6,389,499 B1 | 5/2002 | Frank, Jr. et al. | |
| 6,411,522 B1 | 6/2002 | Frank, Jr. et al. | |
| 6,462,958 B2 | 10/2002 | Ogata | |
| 6,538,886 B2 | 3/2003 | Yu | |
| 6,567,360 B1 | 5/2003 | Kagawa | |
| 6,621,717 B2 | 9/2003 | Tuttle et al. | |
| 6,661,677 B1 | 12/2003 | Rumney | |
| 6,678,112 B1 * | 1/2004 | Kaneko | 360/97.01 |
| 6,908,330 B2 * | 6/2005 | Garrett et al. | 439/378 |
| 6,934,126 B1 * | 8/2005 | Berding et al. | 360/264.2 |
| 7,013,558 B2 | 3/2006 | Bachman | |
| 7,132,609 B2 | 11/2006 | Soule et al. | |
| 7,782,731 B2 * | 8/2010 | Henrichs | 369/95 |

(Continued)

OTHER PUBLICATIONS

"EMI Shielding Solutions," www.electronics-manufacturers.com/info/electronic-components/emi-shielding-solutions.html.com, pp. 1-3, Jan. 2007.

*Primary Examiner* — Daniell L Negrón
*Assistant Examiner* — Huy D Nguyen

(57) ABSTRACT

An information storage device includes a disk drive and a disk drive printed circuit board (PCB) with a disk drive interface connector. A bridge controller PCB is connected to the disk drive interface connector, and includes a host interface connector. An electrically conductive nest of monolithic construction receives the disk drive housing and the bridge controller PCB. The electrically conductive nest includes an enclosure portion enclosing the bridge controller PCB with a conductive grounding tab in contact with the host interface connector. The enclosure portion includes a first plurality of conductive fingers each in contact with the disk drive housing. The electrically conductive nest also includes an extended shield portion adjacent the second side of the disk drive base and overlying the disk drive controller PCB. The extended shield portion includes a second plurality of conductive fingers each in contact with the disk drive housing.

14 Claims, 9 Drawing Sheets

U.S. PATENT DOCUMENTS

| | | | |
|---|---|---|---|
| 2003/0007442 A1* | 1/2003 | Henrichs | 369/95 |
| 2003/0161245 A1* | 8/2003 | Henrichs | 369/95 |
| 2003/0206402 A1 | 11/2003 | Tsuyuki et al. | |
| 2004/0097122 A1* | 5/2004 | Garrett et al. | 439/378 |
| 2007/0153489 A1 | 7/2007 | Fan et al. | |
| 2007/0297160 A1 | 12/2007 | Cochrane et al. | |

* cited by examiner

INFORMATION STORAGE DEVICE HAVING A DISK DRIVE AND A BRIDGE CONTROLLER PCB WITHIN A MONOLITHIC CONDUCTIVE NEST

BACKGROUND OF THE INVENTION

1. Field of the Invention

The present invention relates generally to the field of information storage devices, and more particularly to mounting systems and housings for information storage devices.

2. Background of the Art

Information storage devices are used to retrieve and/or store data for computer systems and other consumer electronics products. A magnetic hard disk drive is an example of an information storage device. Many information storage devices, including magnetic hard disk drives, are sensitive to their external environment, including mechanical shocks, externally applied forces and electromagnetic fields, contamination, changes in temperature and/or humidity, etc. Therefore, an information storage device's housing and mounting system may affect its performance, reliability, and lifetime.

Many information storage devices are housed within the system for which they retrieve and/or store data. For example, so-called "internal" disk drives are housed within a host computer system for which they store data, and therefore internal disk drives may take advantage of the host computer system for electrical power, electromagnetic shielding, convective and/or conductive cooling, vibration dampening, some degree of isolation from external mechanical shocks, etc.

Other information storage devices are not housed within the system for which they retrieve and/or store data. For example, a so-called "external" hard disk drive includes its own housing, which may provide electromagnetic shielding, vibration dampening, some degree of isolation from external mechanical shocks, and active or passive cooling.

The mounting systems and housings for modern information storage devices must often meet challenging space and cost requirements. Accordingly, there is an ongoing need in the art for improved mounting systems and housings for information storage devices.

SUMMARY

A novel information storage device is disclosed and claimed. The information storage device includes a disk drive that includes a spindle, a disk attached to the spindle, and a disk drive housing. The disk drive housing includes a disk drive base having a first side and an opposing second side. The spindle is attached to the disk drive base, and a disk drive cover is attached to the first side of the disk drive base to enclose the spindle and the disk. A disk drive controller printed circuit board (PCB) is attached to the disk drive base and is disposed adjacent the second side of the disk drive base. The disk drive PCB includes a disk drive interface connector. A bridge controller PCB is connected to the disk drive interface connector, and includes a host interface connector. An electrically conductive nest is adapted to receive the disk drive housing and the bridge controller PCB. The electrically conductive nest includes an enclosure portion enclosing the bridge controller PCB, and includes a conductive grounding tab in contact with the host interface connector. The enclosure portion also includes a first plurality of conductive fingers each in contact with the disk drive housing. The electrically conductive nest also includes an extended shield portion adjacent the second side of the disk drive base and overlying the disk drive controller PCB. The extended shield portion includes a second plurality of conductive fingers each in contact with the disk drive housing. The electrically conductive nest consists of a single bent monolithic and continuous sheet of metal rather than being an assembly of sub-components.

DETAILED DESCRIPTION OF EXEMPLARY EMBODIMENTS

Figure 1:
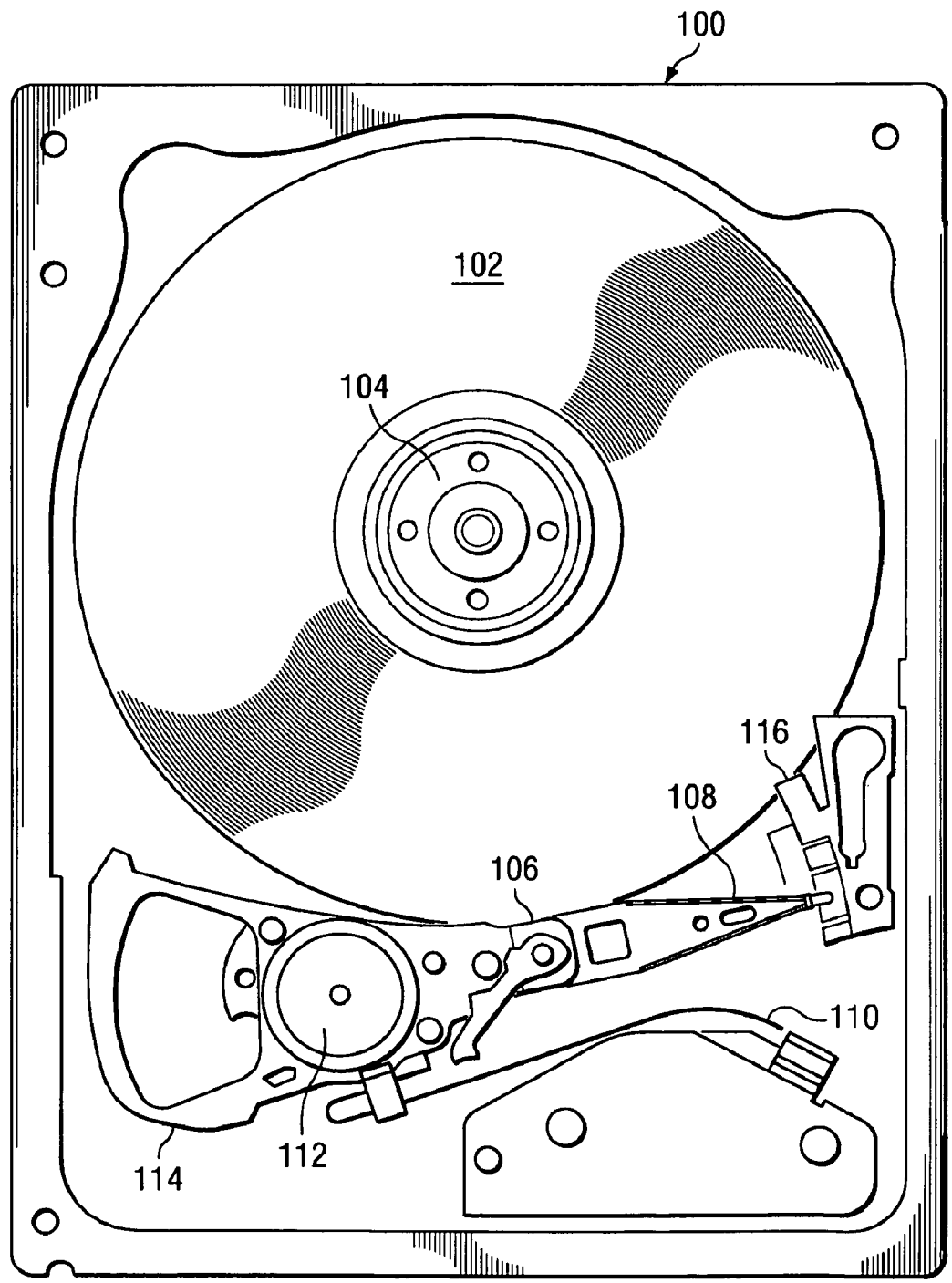
FIG. 1 is a top view of a contemporary hard disk drive with the top cover of its housing removed so that various internal components may be visible.

FIG. 1 is a top view of a contemporary hard disk drive 100 with the top cover of its housing removed so that various internal components may be visible and might be referenced as convenient herein when describing certain aspects of the present invention. For example, disk drive 100 includes a spindle 104 and a disk 102 attached to the spindle 104. Disk drive 100 also includes a head gimbal assembly (HGA) 108 that is positioned over disk 102 by an actuator 106. Actuator 106 pivots about a pivot bearing 112 in response to a varying magnetic field produced by a coil 114. A ramp 116 may be used to control the transition of HGA 108 to an operating position over the disk 102. Control of the actuator 106 and communications to/from the HGA 108 is facilitated by a disk drive controller printed circuit board (PCB) via a flex cable 110. The disk drive controller PCB is located beneath the baseplate of the housing of disk drive 100, and therefore is not visible in this view. Contemporary disk drive 100 may be of various sizes or "form factors." For example, disk drive 100 may be a so-called 3.5" form-factor disk drive, a 2.5" form factor disk drive, or a 1.8" form factor disk drive, among others.

Figure 2:
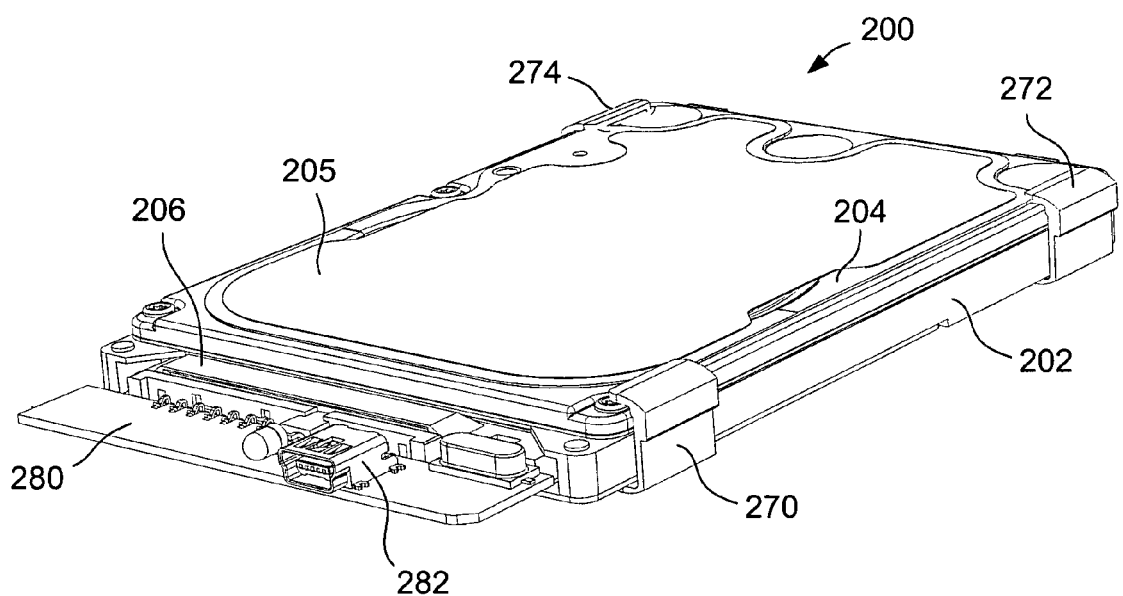
FIG. 2 is a perspective view of a disk drive and bridge controller printed circuit board of an information storage device according to an exemplary embodiment of the present invention.

FIG. 2 is a perspective view of a disk drive 200 and bridge controller PCB 280 of an information storage device according to an exemplary embodiment of the present invention. The disk drive 200 includes a disk drive controller PCB attached to the disk drive base 202, but the disk drive controller PCB is not visible in the view of FIG. 2 because it is disposed adjacent the underside of the disk drive base 202 as shown in this view (i.e. the side opposite the disk drive cover 204). Accordingly, the side of the disk drive base 202 facing and contacting the disk drive cover 204 may be referred to as the "first side" of the disk drive base 202, and the underside of the disk drive base 202 as shown in FIG. 2 may be referred to as the "second side" of the disk drive base 202. Note that in the embodiment of FIG. 2, the disk drive cover 204 includes an optional conventional constrained layer damper 205.

The disk drive controller PCB may include disk drive controller circuitry to control the rotation of a spindle motor within the disk drive 200 and the motion of an actuator within the disk drive 200. As shown in FIG. 2, the disk drive controller PCB includes a disk drive interface connector 206, and the bridge controller PCB 280 is connected to the disk drive interface connector 206. In the embodiment of FIG. 2, the bridge controller PCB 280 is optionally supported only by its connection to the disk drive interface connector 206, simplifying the mechanical design (to enhance manufacturability and reduce cost). The disk drive interface connector 206 may be a Serial Advanced Technology Attachment (SATA) compliant connector or a Parallel Advanced Technology Attachment (PATA) compliant connector, for example.

The bridge controller PCB 280 may, for example, enable the information storage device to transfer data to/from a separate computer system. The bridge controller PCB 280 includes a host interface connector 282, which may be an IEEE 1394 compliant connector, an Enhanced Serial Advanced Technology Attachment (eSATA) compliant connector, or a Universal Serial Bus (USB) compliant connector as shown in the embodiment of FIG. 2. The bridge controller PCB 280 may, for example, be a SATA compliant controller PCB that includes circuitry to control a SATA compliant interface.

In the embodiment of FIG. 2, three clips 270, 272, 274 are shown to be temporarily positioned near the corners of disk drive 200. However, this depiction is only to show where the clips would be positioned later in the assembly of the complete information storage device, and/or to show how the clips might be carried by the disk drive 200 during an intermediate step in the assembly of the information storage device. Temporarily positioning the clips 270, 272, 274 near the corners of disk drive 200 may provide for enhanced mechanical shock robustness during assembly of the information storage device, for example, if the clips are made from an elastomeric material. The use and position of clips, like clips 270, 272, 274, are depicted later in FIGS. 4A-C and 5, and are described with reference to those figures.

Figure 3A:
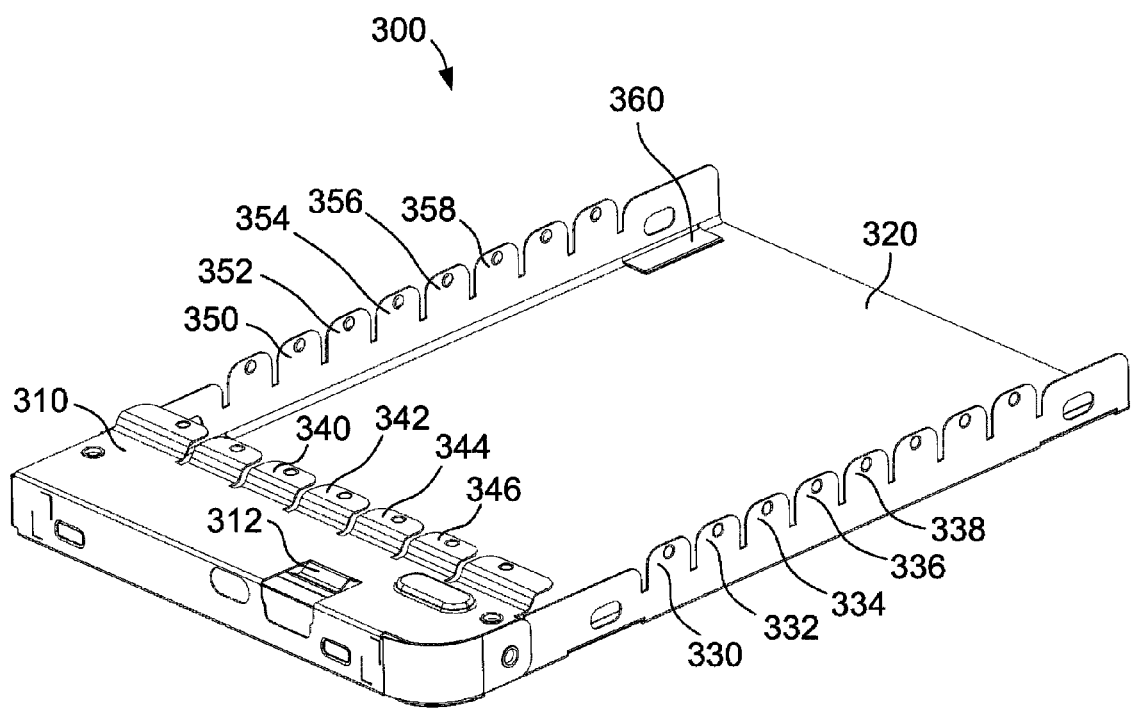
FIG. 3A is a top perspective view of an electrically conductive nest, according to an exemplary embodiment of the present invention.
Figure 3B:
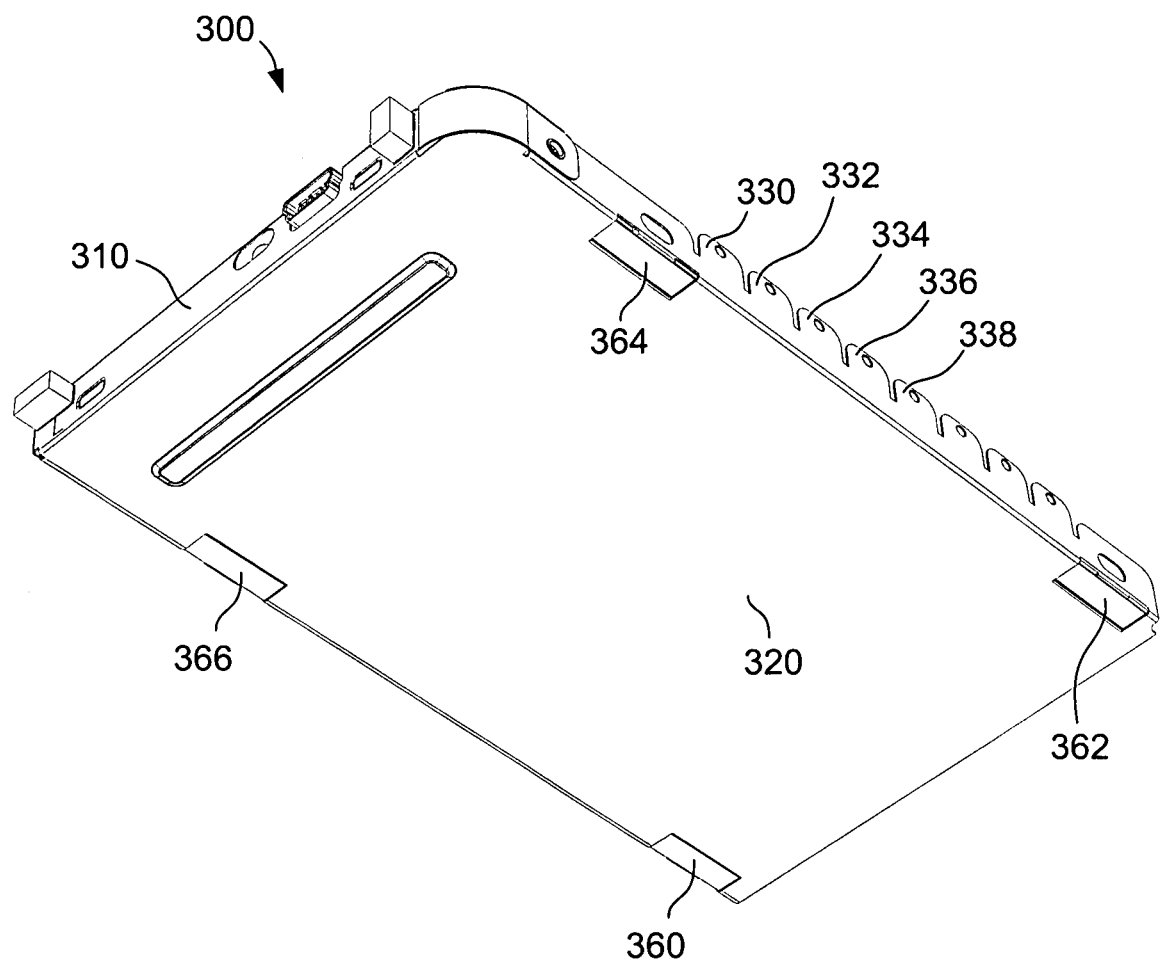
FIG. 3B is a bottom perspective view of the electrically conductive nest of FIG. 3A.

FIG. 3A is a top perspective view of an electrically conductive nest 300, according to an exemplary embodiment of the present invention. FIG. 3B is a bottom perspective view of the electrically conductive nest 300. Note that in the embodiment of FIGS. 3A and 3B, the electrically conductive nest 300 consists of a single bent monolithic and continuous sheet of metal rather than being an assembly of sub-components, and this may enhance shielding performance and also may reduce cost and part count during fabrication. For example, the electrically conductive nest 300 may be fabricated from cold rolled steel in deference to cost considerations, or alternatively from stainless steel in deference to certain performance considerations (e.g. corrosion). The sheet metal thickness is preferably but not necessarily, in the range 0.1 mm to 0.5 mm for information storage devices that include a 2.5" form-factor disk drive. In certain embodiments, the sheet metal may be plated, for example with tin, nickel, and/or zinc.

The electrically conductive nest 300 of FIGS. 3A and 3B is adapted to receive, for example, the disk drive 200 and the bridge controller PCB 280 that is shown in FIG. 2. Specifically, the electrically conductive nest 300 includes an enclosure portion 310 adapted to enclose the bridge controller PCB 280. The electrically conductive nest 300 also includes a conductive grounding tab 312 adapted to contact a host interface connector such as host interface connector 282 of FIG. 2. The enclosure portion 310 also includes a first plurality of conductive fingers 340, 342, 344, 346, each adapted to contact a disk drive housing (e.g. top cover 204 of the housing of disk drive 200). Each of the first plurality of conductive fingers 340, 342, 344, 346 includes a location of contact with the disk drive housing that is preferably no more than 10 mm from that of an adjacent one of the first plurality of conductive fingers. Such a spacing limitation may enhance the ability of the enclosure portion 310 to shield high frequency electromagnetic noise, for example up to 1.5 GHz.

In the embodiment of FIGS. 3A and 3B, the electrically conductive nest 300 also includes an extended shield portion 320 adapted to be disposed adjacent a disk drive base (e.g. adjacent the underside of disk drive base 202 of FIG. 2) and to at least partially overlie a disk drive controller PCB. Preferably, the extended shield portion 320 is adapted to cover the disk drive controller PCB so as to substantially shield the disk drive controller PCB from emitting excessive electromagnetic noise. In this sense, overlying does not require or imply a relative position with respect to the direction of gravity. Rather, the extended shield portion 320 is adapted to overlie a disk drive controller PCB simply in the sense that at least a portion of the disk drive controller PCB is disposed between the extended shield portion 320 and a disk drive base (e.g. the underside of disk drive base 202 of FIG. 2).

In the embodiment of FIGS. 3A and 3B, the extended shield portion 320 includes a second plurality of conductive fingers (e.g. 330, 332, 334, 336, 338, and/or 350, 352, 354, 356, 358), each adapted to contact a disk drive housing (e.g. disk drive base 202 of the housing of disk drive 200). Each of the second plurality of conductive fingers 330, 332, 334, 336, 338, and/or 350, 352, 354, 356, 358 includes a location of contact with the disk drive housing that is preferably no more than 10 mm from that of an adjacent one of the second plurality of conductive fingers. Such a spacing limitation may enhance the ability of the extended shield portion 320 to shield high frequency electromagnetic noise, for example up to 1.5 GHz.

Also as shown in FIGS. 3A and 3B, the extended shield portion 320 optionally but preferably also includes a plurality of conductive base contact regions 360, 362, 364, 366, each adapted to contact a disk drive base (e.g. disk drive base 202 of FIG. 2). As shown in FIGS. 3A and 3B, the conductive base contact regions 360, 362, 364, 366, may comprise rectangular regions that preferably protrude slightly inwardly from the extended shield portion 320. However, such regions need not be rectangular in shape and do not necessarily have to protrude from the extended shield portion 320, though such protrusion may be advantageous for consistent electrical coupling to a disk drive base in view of manufacturing tolerances.

Preferably but not necessarily, the electrically conductive nest 300 includes a layer of dielectric material (e.g. Mylar) that is adapted to be disposed between the disk drive controller PCB (e.g. the bridge controller PCB 280 that is shown in FIG. 2) and the extended shield portion 320. The layer of dielectric material cannot be discerned in FIG. 3A because it is a uniform layer on the extended shield portion 320 (except absent in the regions of the conductive base contact regions 360, 362, 364, 366). The layer of dielectric material cannot be discerned in FIG. 3B because it is on the opposite side of the extended shield portion 320. If the extended shield portion 320 includes a plurality of conductive base contact regions (e.g. conductive base contact regions 360, 362, 364, 366), then the layer of dielectric material is preferably absent at the location of the conductive base contact regions, so that there is no layer of dielectric material between each of the plurality of conductive base contact regions (e.g. conductive base contact regions 360, 362, 364, 366) and the disk drive base (e.g. disk drive base 202 of the housing of disk drive 200). Such a dielectric material layer design may facilitate electrical insulation for exposed electrical components of the disk drive controller PCB, while allowing adequate electrical conduction between the extended shield portion 320 and the disk drive base.

Figure 4A:
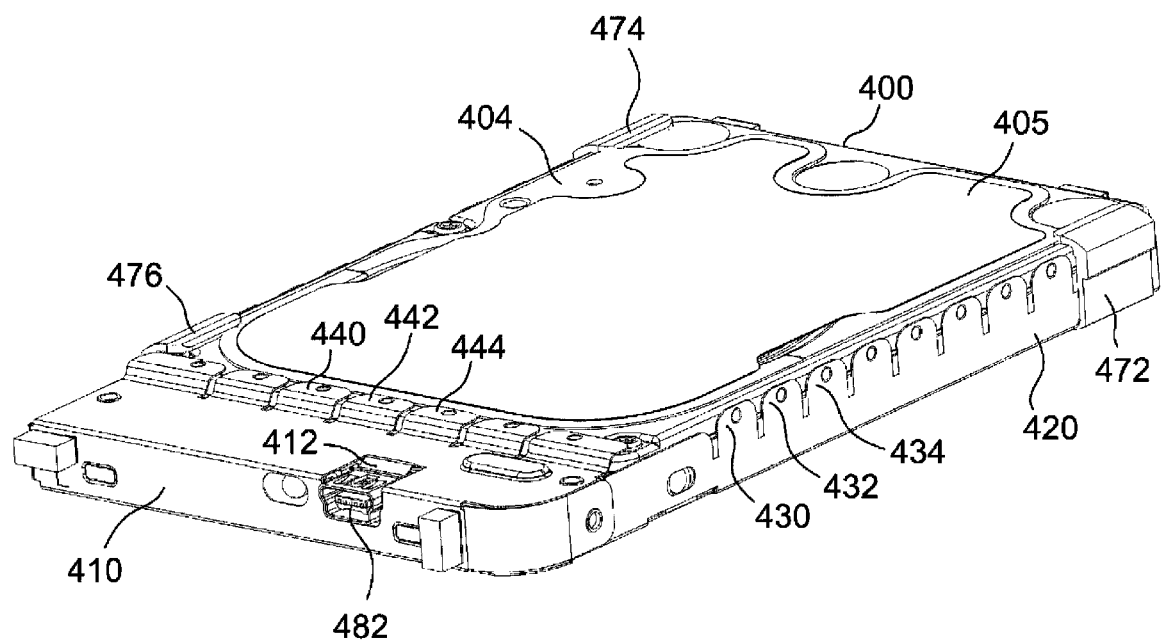
FIG. 4A is a top perspective view of a disk drive and bridge controller printed circuit board within an electrically conductive nest according to an exemplary embodiment of the present invention.
Figure 4B:
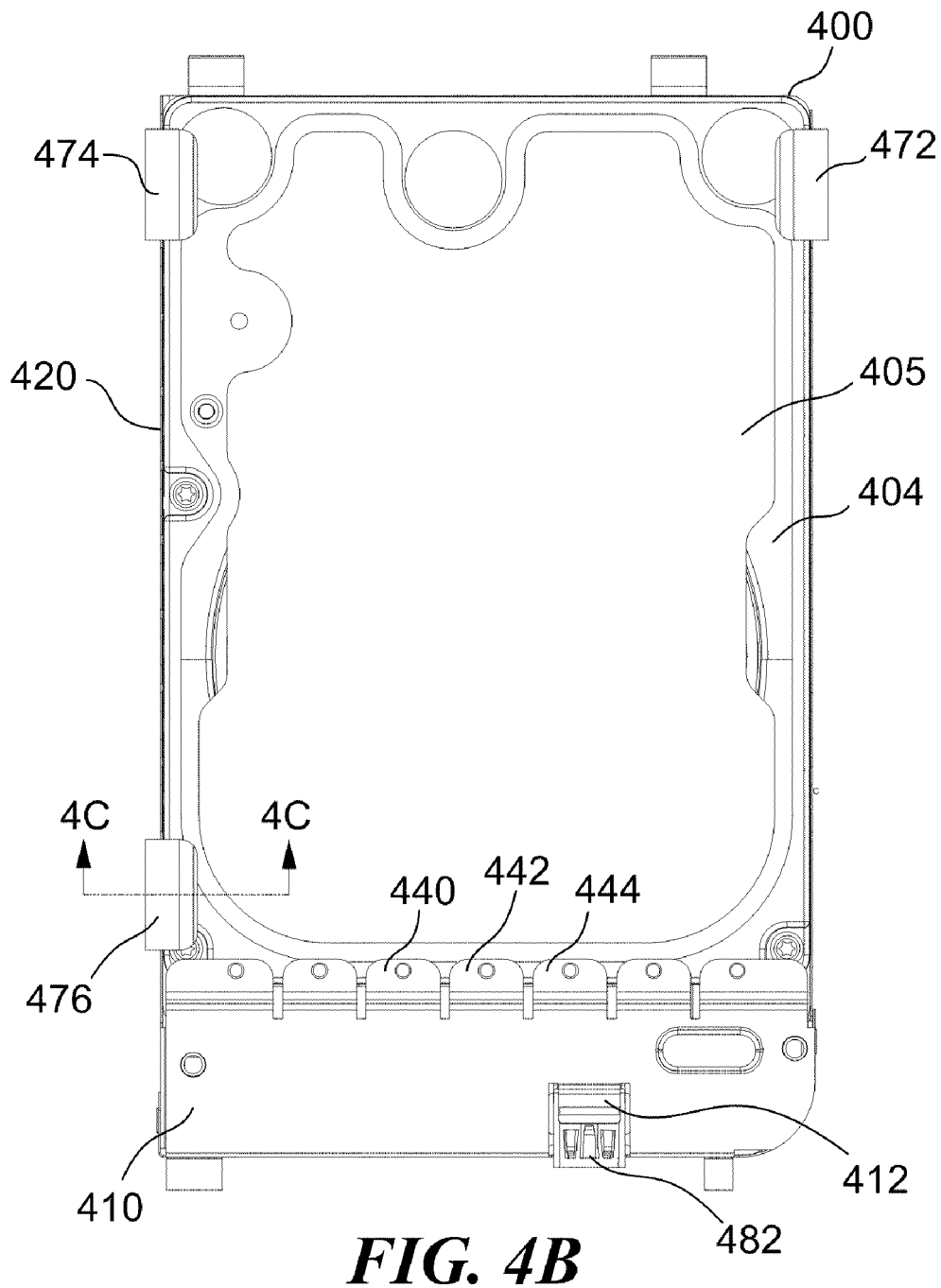
FIG. 4B is a top view of the information storage device components of FIG. 4A.
Figure 4C:
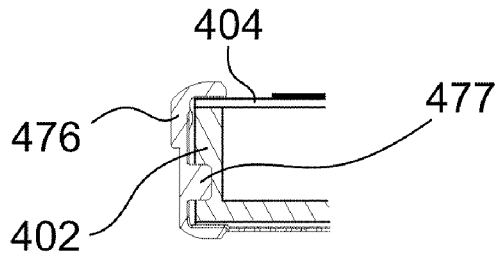
FIG. 4C is a side cross-sectional view of a clip that is mechanically biasing the disk drive against the electrically conductive nest of FIGS. 4A and 4B.

FIG. 4A is a top perspective view of a disk drive 400 and bridge controller printed circuit board within an electrically conductive nest, according to an exemplary embodiment of the present invention. FIG. 4B is a top view of the information storage device components of FIG. 4A. FIG. 4C is a side cross-sectional view of a clip 476 that is mechanically biasing the disk drive 400 against the electrically conductive nest of FIGS. 4A and 4B. In the embodiment of FIGS. 4A, 4B, and 4C, the electrically conductive nest consists of a single bent monolithic and continuous sheet of metal rather than being an assembly of sub-components. This may enhance shielding performance and also may reduce cost and part count during fabrication.

An enclosure portion 410 of the electrically conductive nest of FIGS. 4A, 4B, and 4C has received the bridge controller printed circuit board connected to the disk drive interface connector of the disk drive controller PCB of disk drive 400. The enclosure portion 410 includes a conductive grounding tab 412 in contact with the host interface connector 482 of the enclosed bridge controller printed circuit board. The enclosure portion 410 also includes a first plurality of conductive fingers 440, 442, 444, each in contact with the top cover 404 of the housing of disk drive 400. Note that in the embodiment of FIGS. 4A, 4B, and 4C, the disk drive cover 404 includes an optional conventional constrained layer damper 405. Each of the first plurality of conductive fingers 440, 442, 444 includes a location of contact with the disk drive housing that is preferably no more than 10 mm from that of an adjacent one of the first plurality of conductive fingers. Such a spacing limitation may enhance the ability of the enclosure portion 410 to shield high frequency electromagnetic noise, for example up to 1.5 GHz.

In the embodiment of FIGS. 4A, 4B, and 4C, an extended shield portion 420 is adjacent the base 402 of the housing of disk drive 400, and overlies the disk drive controller PCB. The extended shield portion 420 includes a second plurality of conductive fingers 430, 432, 434, each in contact with the base 402 of the housing of disk drive 400. Each of the second plurality of conductive fingers 430, 432, 434 includes a location of contact with the disk drive housing that is preferably no more than 10 mm from that of an adjacent one of the second plurality of conductive fingers. Such a spacing limitation may enhance the ability of the extended shield portion 420 to shield high frequency electromagnetic noise, for example up to 1.5 GHz.

In the embodiment of FIGS. 4A, 4B, and 4C, a plurality of clips 472, 474, and 476 mechanically biases the disk drive 400 towards extended shield portion 420 of the electrically conductive nest and vice versa. For example, the clips 472, 474, and 476 may mechanically bias a plurality of conductive base contact regions of the extended shield portion 420 to be in contact with the underside of the base 402 of the disk drive 400. Each of the clips 472, 474, and 476 is in contact with both the disk drive top cover 404 and the extended shield portion 420 of the electrically conductive nest. If the clips comprise an elastomeric material, they may serve the three-fold purpose of (1) providing some isolation, attenuation, and/or damping of externally applied mechanical shocks, and (2) accommodating dimensional part-to-part variation during assembly, in addition to (3) the mechanical biasing described previously. For reliable and repeatable positioning during assembly, and in the case of an elastomeric clip to enhance the performance described above, each of the plurality of clips 472, 474, and 476 may include a projection (e.g. projection 477 of clip 476) that extends into a hole in the disk drive base 402 as shown in FIG. 4C.

Figure 5:
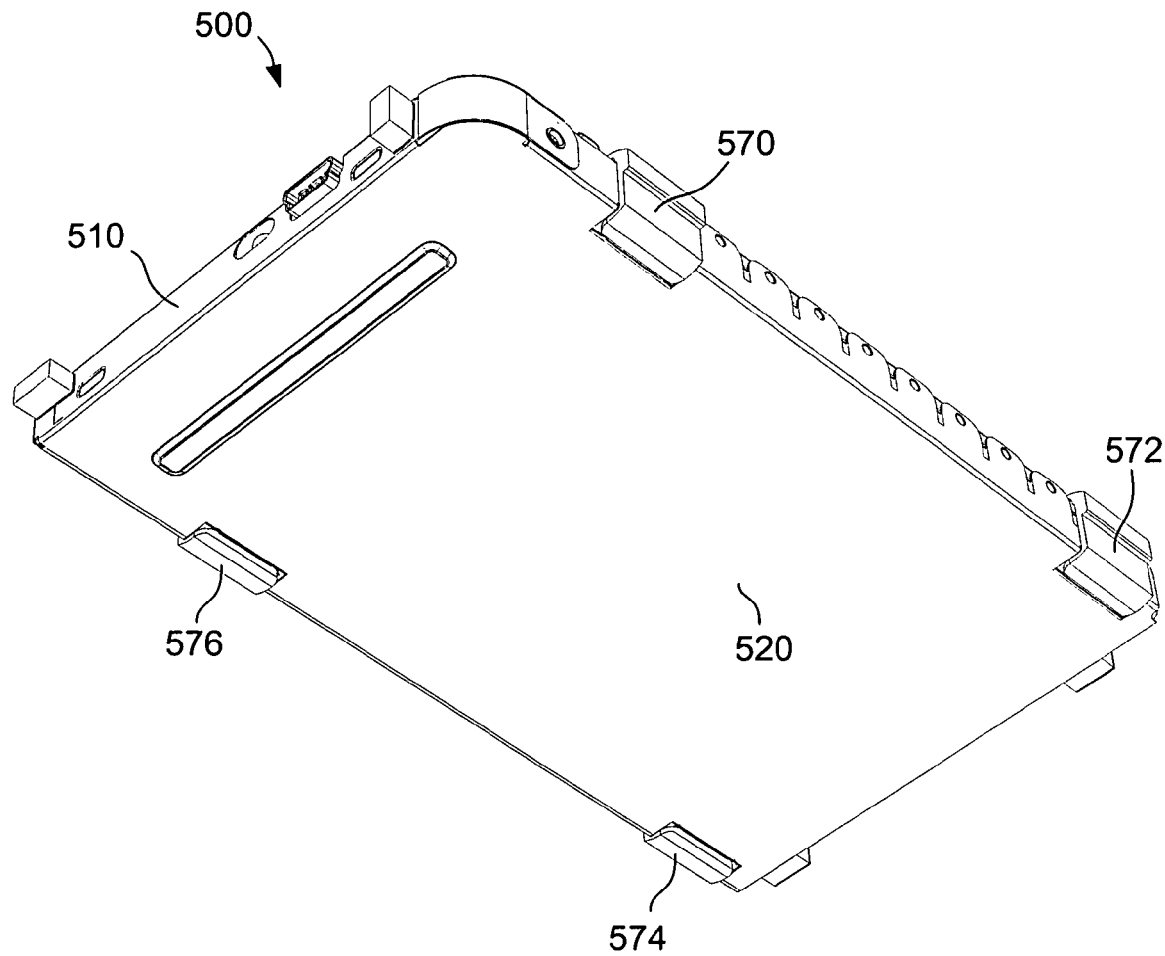
FIG. 5 is a bottom perspective view of an information storage device according to an exemplary embodiment of the present invention.

FIG. 5 is a bottom perspective view of an information storage device 500 comprising a disk drive and bridge controller printed circuit board within an electrically conductive nest, according to an exemplary embodiment of the present invention. The electrically conductive nest of FIG. 5 includes an enclosure portion 510 and an extended shield portion 520. In the embodiment of FIG. 5, a plurality of clips 570, 572, 574, and 576 mechanically biases the extended shield portion 420 of the electrically conductive nest towards the base of the enclosed disk drive. If the clips comprise an elastomeric material, they may serve the three-fold purpose of (1) providing some isolation, attenuation, and/or damping of externally applied mechanical shocks, and (2) accommodating dimensional part-to-part variation during assembly, in addition to (3) the mechanical biasing described previously.

Figure 6A:
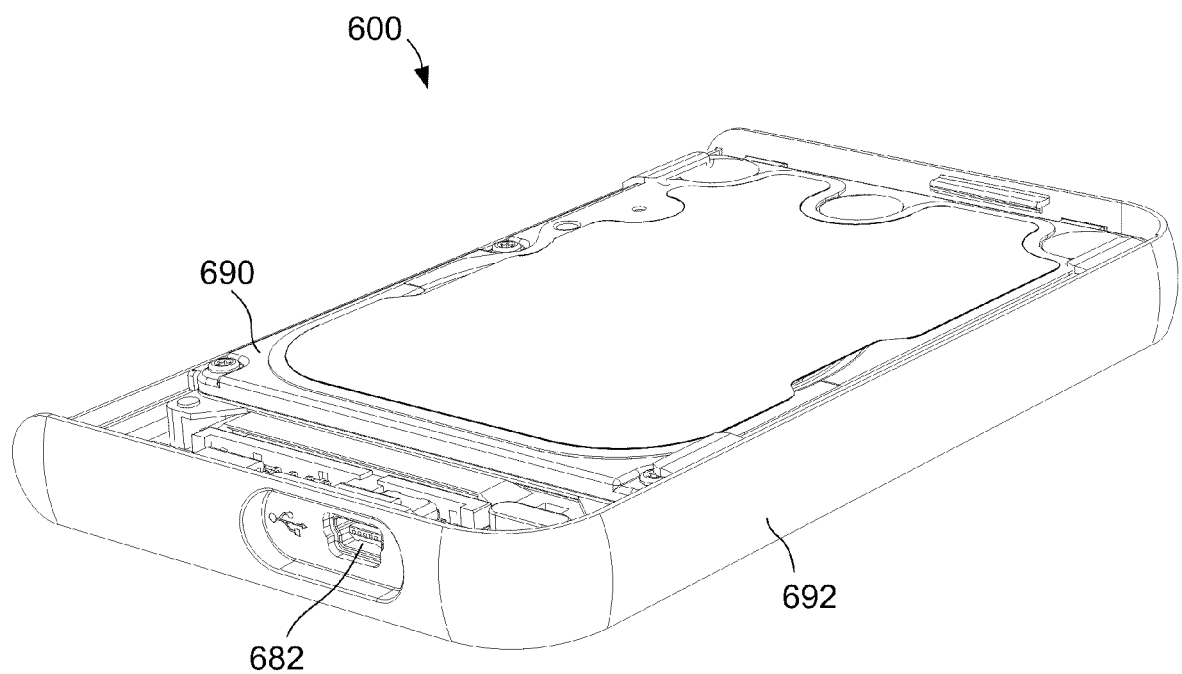
FIG. 6A is a top perspective view of an information storage device according to an embodiment of the present invention, with an external cover removed.
Figure 6B:
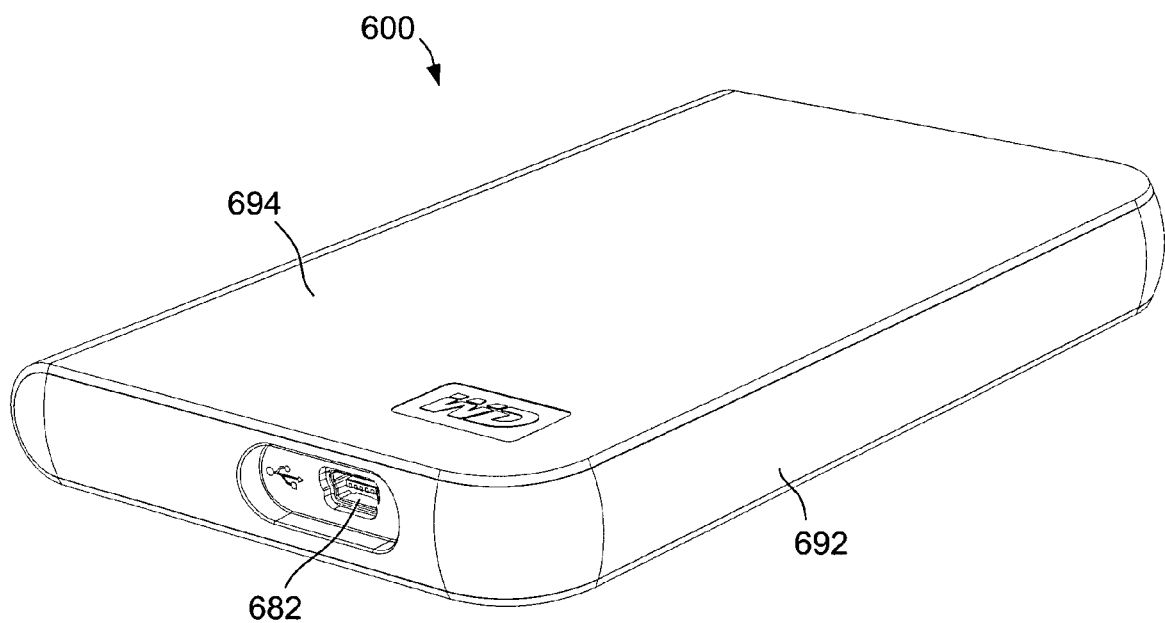
FIG. 6B depicts the information storage device of FIG. 6A, having an external cover in place.

FIG. 6A is a top perspective view of an information storage device 600 according to an embodiment of the present invention, with an external cover removed. The assembly 690 of a disk drive, bridge controller PCB, and electrically conductive nest, is further enclosed in an external housing 692. The external housing 692 is preferably but not necessarily fabricated from plastic, and preferably has an opening through which a host interface connector 682 may be conveniently accessed. FIG. 6B depicts the information storage device 600 of FIG. 6A, having an external cover 694 in place. The external cover 694 is preferably fabricated from the same plastic material as is the external housing 692.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. An information storage device comprising:
   a disk drive including
      a spindle;
      a disk attached to the spindle;
      a disk drive housing, the disk drive housing including a disk drive base having a first side and an opposing second side, the spindle attached to the disk drive base, and a disk drive cover attached to the first side of the disk drive base to enclose the spindle and the disk; and
      a disk drive controller printed circuit board attached to the disk drive base and disposed adjacent the second side of the disk drive base, the disk drive printed circuit board including a disk drive interface connector;

a bridge controller printed circuit board connected to the disk drive interface connector, the bridge controller printed circuit board including a host interface connector; and an electrically conductive nest adapted to receive the disk drive housing and the bridge controller printed circuit board, the electrically conductive nest including:

an enclosure portion enclosing the bridge controller printed circuit board and including a conductive grounding tab in contact with the host interface connector, the enclosure portion also including a first plurality of conductive fingers each in contact with the disk drive housing; and an extended shield portion adjacent the second side of the disk drive base and overlying the disk drive controller printed circuit board, the extended shield portion including a second plurality of conductive fingers each in contact with the disk drive housing;

wherein the electrically conductive nest consists of a single bent monolithic and continuous sheet of metal rather than being an assembly of sub-components.

2. The information storage device of claim 1 wherein the extended shield portion further comprises a plurality of conductive base contact regions each in contact with the second side of the disk drive base.

3. The information storage device of claim 2 further comprising a plurality of clips, each of the clips in contact with the disk drive cover and the extended shield portion of the electrically conductive nest to mechanically bias the second side of the disk drive base to be in contact with the conductive base contact regions.

4. The information storage device of claim 3 wherein the clips comprise an elastomeric material.

5. The information storage device of claim 3 wherein each of the plurality of clips includes a projection that extends into a hole in the disk drive base.

6. The information storage device of claim 2 further comprising a layer of dielectric material disposed between the disk drive controller printed circuit board and the extended shield portion, and wherein the layer of dielectric material is absent between each of the plurality of conductive base contact regions and the second side of the disk drive base.

7. The information storage device of claim 6 wherein the dielectric material layer comprises Mylar.

8. The information storage device of claim 1 wherein each of the first plurality of conductive fingers includes a location of contact with the disk drive housing that is no more than 10 mm from that of an adjacent one of the first plurality of conductive fingers.

9. The information storage device of claim 1 wherein each of the second plurality of conductive fingers includes a location of contact with the disk drive housing that is no more than 10 mm from that of an adjacent one of the second plurality of conductive fingers.

10. The information storage device of claim 1 wherein the disk drive interface connector is a Serial Advanced Technology Attachment (SATA) compliant connector.

11. The information storage device of claim 1 wherein the host interface connector is a Universal Serial Bus (USB) compliant connector.

12. The information storage device of claim 1 wherein the host interface connector is a IEEE 1394 compliant connector.

13. The information storage device of claim 1 wherein the disk drive is a 2.5" form-factor disk drive, and wherein the sheet of metal has a thickness in the range 0.1 mm to 0.5 mm.

14. The information storage device of claim 1 wherein the sheet of metal is plated with a metal selected from the group consisting of tin, nickel, and zinc.

* * * * *